US008433751B2

(12) United States Patent
Burns et al.

(10) Patent No.: US 8,433,751 B2
(45) Date of Patent: Apr. 30, 2013

(54) SYSTEM AND METHOD FOR SHARING NOTES (75) Inventors: Roland John Burns, Fort Collins, CO (US); Johan Jeansson, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 2722 days.

(21) Appl. No.: 11/077,006

(22) Filed: Mar. 8, 2005

(65) Prior Publication Data
US 2006/0206564 A1    Sep. 14, 2006

(51) Int. Cl.
G06F 15/16    (2006.01)
(52) U.S. Cl.
USPC ........................................................... 709/204
(58) Field of Classification Search .................. 709/204, 709/202, 203
See application file for complete search history.

(56) References Cited

U.S. PATENT DOCUMENTS

| | | | |
|---|---|---|---|
| 5,996,002 A * | 11/1999 | Katsurabayashi et al. | 709/204 |
| 6,422,775 B1 * | 7/2002 | Bramlett et al. | 401/195 |
| 6,611,259 B1 * | 8/2003 | Tillgren et al. | 345/179 |
| 2002/0138568 A1 * | 9/2002 | Johansson | 709/203 |
| 2003/0107558 A1 * | 6/2003 | Bryborn et al. | 345/179 |
| 2003/0207244 A1 * | 11/2003 | Sakai et al. | 434/350 |
| 2005/0024346 A1 * | 2/2005 | Dupraz et al. | 345/179 |
| 2005/0034072 A1 * | 2/2005 | Sherr | 715/534 |
| 2005/0138541 A1 * | 6/2005 | Euchner et al. | 715/512 |
| 2005/0177534 A1 * | 8/2005 | Brorsson | 707/1 |
| 2005/0281437 A1 * | 12/2005 | Fruchter et al. | 382/113 |
| 2006/0050669 A1 * | 3/2006 | Kaikuranta et al. | 370/338 |
| 2006/0159345 A1 * | 7/2006 | Clary et al. | 382/186 |
| 2008/0012839 A1 * | 1/2008 | Feague et al. | 345/179 |

* cited by examiner

Primary Examiner — Jason Recek (57) ABSTRACT

Systems, methods and techniques are provided in which pens capable of capturing and transmitting information representative marks made by them, e.g., wireless-enabled digital pens, are used. In one representative implementation, notes taken during a meeting automatically are wirelessly transferred (i.e., copied and/or moved) among devices used by the participants, thereby providing for automatic sharing of notes among the meeting participants.

23 Claims, 8 Drawing Sheets

SYSTEM AND METHOD FOR SHARING NOTES

BACKGROUND OF THE INVENTION

1. Field of the Invention

The present invention pertains to systems, methods and techniques for sharing copies of handwritten notes among participants in a meeting.

2. Description of the Related Art

Most professionals attend at least several meetings in the course of any given workday. Later, it often is desirable to retrieve some portion of information that was discussed during a particular meeting. However, given the professional's busy work schedule, he or she typically will have difficulty recalling all of the details from each meeting that he or she attended. For example, a professional might recall that a particularly helpful chart or other illustration was drawn during a meeting and will want to obtain a copy of that drawing. However, tracking down a single piece of paper from a meeting that may have occurred days or even weeks ago, particularly if the attendee does not remember exactly who created the illustration, often can be difficult and time-consuming, if not impossible.

Currently, in order for meeting members to share the results of a meeting, typically all the input would have to be collected, merged, transcribed and circulated. This rarely occurs and when it does it rarely is timely and often is inaccurate, allowing the collator considerable latitude to re-interpret what happened.

BRIEF DESCRIPTION OF THE DRAWINGS

The following is a brief description of the drawings. It should be understood that the included drawings illustrate certain aspects of representative embodiments of the invention and are not intended to limit the scope of the claims in any manner.

DESCRIPTION OF THE PREFERRED EMBODIMENT(S)

Figure 1:
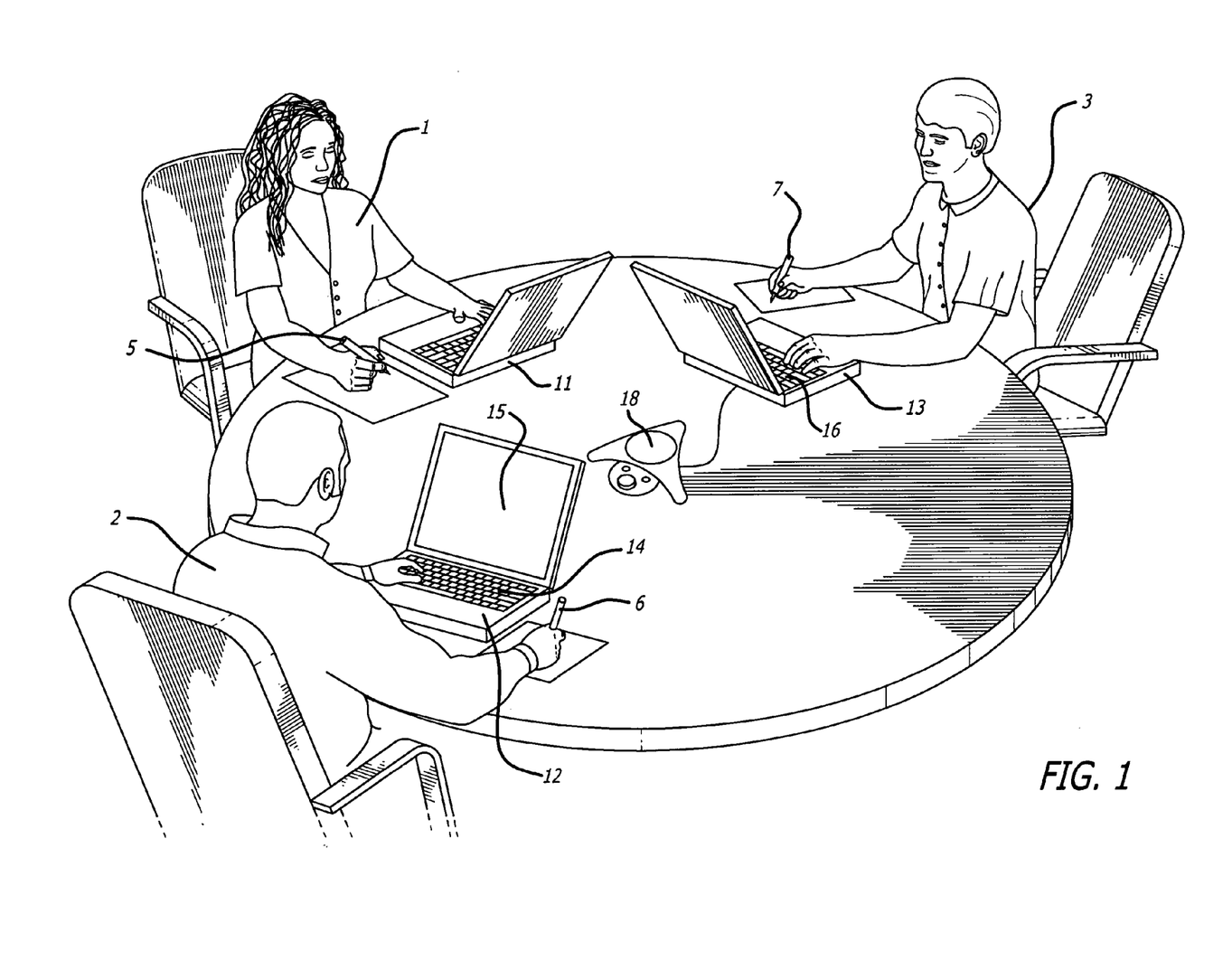
FIG. 1 is a perspective view of one example of a meeting in which a system according to a representative embodiment of the present invention is utilized.

FIG. 1 illustrates a meeting in which a system according to the present invention is utilized. As shown, three participants 1-3 are present for the meeting, each using a digital pen 5-7. Each of digital pens 5-7 is capable of writing on paper in ink, and in addition is capable of digitizing and internally storing any marks made by such pen. In these aspects, digital pens 5-7 are similar to many conventional digital pens that currently are sold.

Conventionally, a number of different types of digital pens are sold. Such digital pens may be categorized by the way in which they detect handwritten marks made by the user. In the preferred embodiments of the present invention, digital pens 5-7 (as well as any other digital pens referenced below) are of the type that utilizes a miniature camera for detecting preprinted patterns made on the paper, as well as marks made by the pen itself. As a result, by using paper with appropriately preprinted patterns, each digital pen 5-7 is capable of accurately identifying exactly individual pieces of paper, either uniquely or as a member of a particular set, and distinguishing precisely where on the paper any given mark is made.

Not only can this result in accurate digitization of handwritten marks for subsequent storage, but such a configuration also can permit instructions to be executed by the pen, triggered by codes detected on the paper being used and/or triggered by marks made by the user in relation to certain preprinted elements on the paper. Thus, for example, checking a particular box on a particular piece of paper may be interpreted as instructing the pen to perform a pre-specified instruction or set of instructions. One example of a digital pen that has the foregoing capabilities is the Hewlett-Packard Digital Pen, which stores pen strokes internally and then, upon being inserted into a cradle, downloads the digitized marks into a computer.

For purposes of the present invention, pens 5-7 preferably are wireless-enabled and, more preferably, are Bluetooth-enabled digital pens, such as the Nokia Digital Pen, which currently is sold through a joint effort between Hewlett-Packard and Nokia. As a result, in accordance with the present invention, the digitized notes stored within the digital pens 5-7 can be transferred among devices using Bluetooth. More specifically, pens 5-7 preferably are configured (e.g., through software, firmware, dedicated hardware or any combination of the foregoing) to execute the functionality ascribed to digital pens 5-7 in the following discussion.

According to the first representative embodiment of the invention, the wireless-enabled digital pens 5-7 share meeting notes directly with each other, so that each of the digital pens for 5-7 leaves the meeting with an entire record of all notes taken during the meeting (possibly subject to certain caveats, as described in more detail below). In other embodiments of the invention, any or all of participants 1-3 utilize an additional wireless or hardwired network-enabled device, such as computers 11-13. The use of such additional devices provides the opportunity for the notes to be transferred directly to such devices, rather than to the pens 5-7 themselves. In the illustration of FIG. 1, for example, laptop computer 12 preferably receives all of the notes generated during the meeting and then displays them on its display screen 15 in real time. Moreover, through user interface 14, the meeting participant 2 preferably is provided with the ability to toggle screens, viewing each participant's notes as desired, or even causing multiple participants' notes to be displayed simultaneously (e.g., side-by-side).

According to still further embodiments of the invention, an omnidirectional microphone and/or video camera 18 is provided for purposes of recording the meeting. As discussed in more detail below, this data preferably is synchronized or otherwise combined with the digitized notes in order to create an entire record of the meeting.

In a first representative embodiment of the invention, each of the digital pens 5-7 is configured to communicate wirelessly with the others, allowing a meeting to be set up in which each participant 1-3 shares his or her notes with the other participants 1-3 automatically and in real time. A conceptual block diagram showing this configuration is illustrated in FIG. 2.

Figure 2:
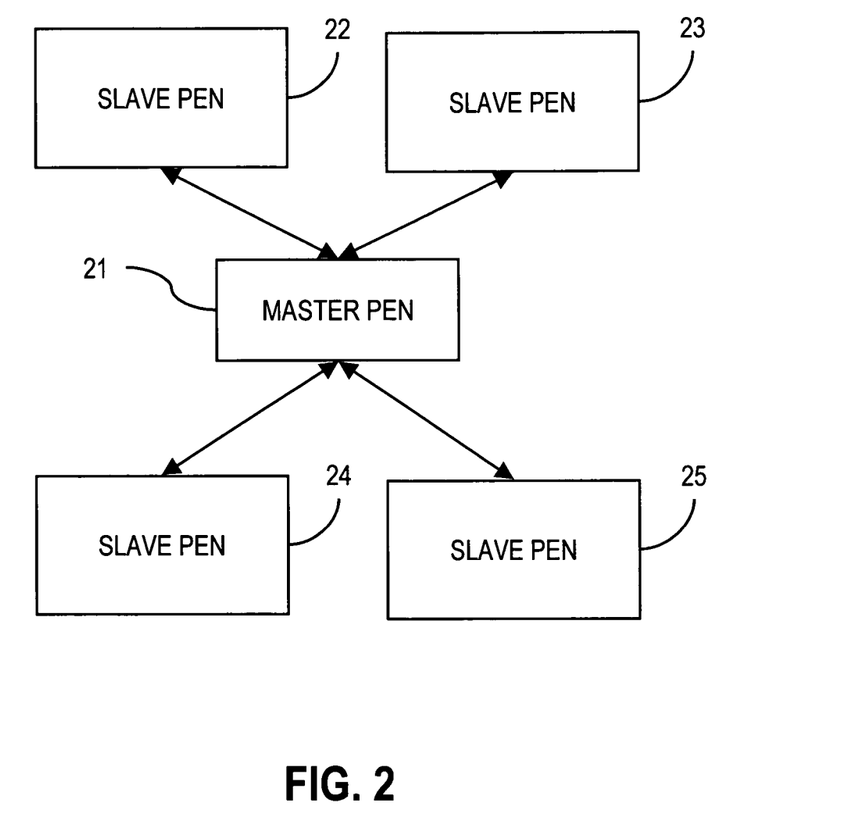
FIG. 2 is a conceptual block diagram of a system according to a first representative embodiment of the present invention.

In the configuration shown in FIG. 2, five digital pens 21-25 (e.g., including pens 5-7) are used in the meeting. Because the pens communicate with each other through Bluetooth technology in the present embodiment, one of the pens 21 is designated as the master and the rest 22-25 are designated as slaves. In this embodiment, the master 21 is responsible for collecting digitized handwritten notes from each of the slaves 22-25, organizing the data, and then distributing any missing data to slaves 22-25, as described in more detail below.

Although five digital pens 21-25 are illustrated in FIG. 2, it should be understood that this is for illustration purposes only. Any other number of pens instead may be used. According to the Bluetooth protocols, a piconet is limited to 8 Bluetooth devices. However, the total number of devices can be increased to 255 by either using the Bluetooth "slave parking" mechanism or scatternets (where the piconet master is a slave on another piconet).

Figure 3:
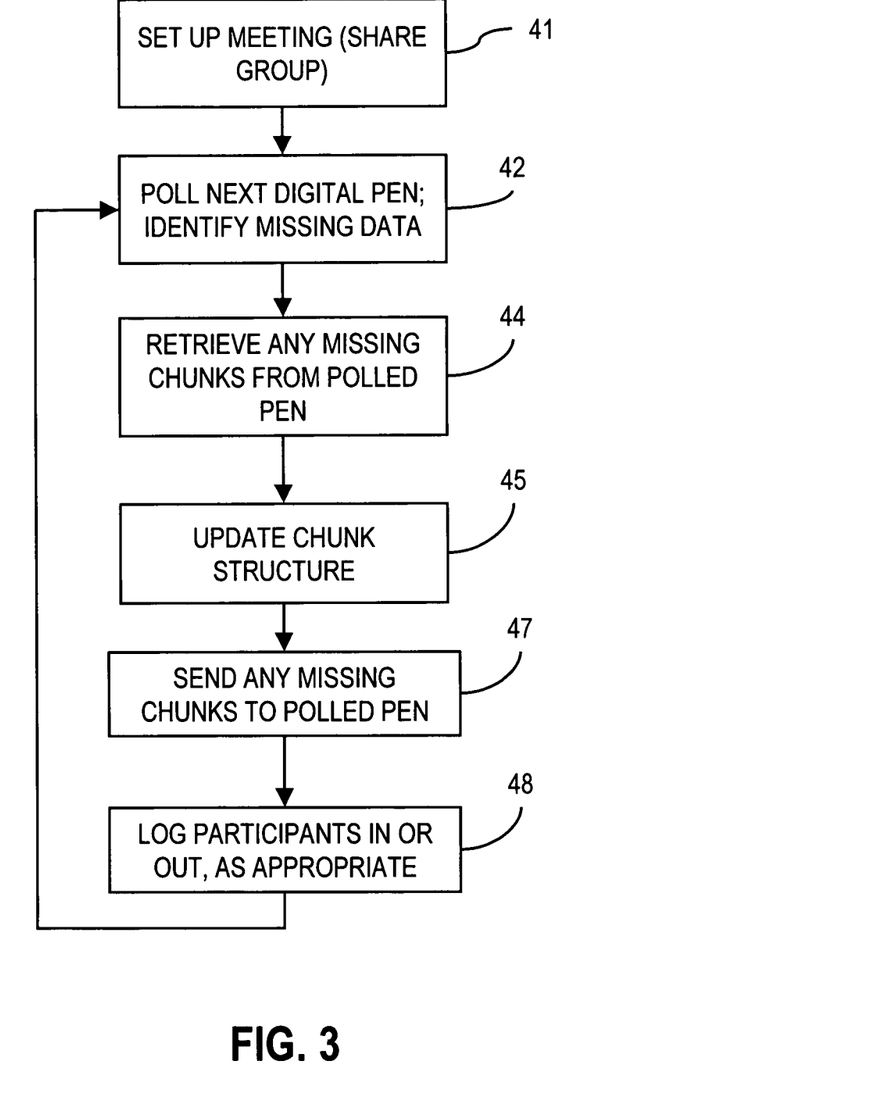
FIG. 3 is a flow diagram for explaining the distribution of data chunks among a network of digital pens according to the first representative embodiment of the present invention.

FIG. 3 is a flow diagram for explaining one technique for distributing data chunks among a network of digital pens according to the configuration illustrated in FIG. 2.

Initially, in step 41 the meeting is initiated. This may be accomplished in any of a variety of different ways. For example, in one embodiment the master 21 simply polls to determine what other Bluetooth-enabled digital pens are in the vicinity at that time and then assign the meeting ID to the identified digital pens. However, one preferred goal in initiating a meeting according to the present invention is to limit the participants in the corresponding share group to specified individuals. This can be important because the digital pens 21-25 will communicate with each other wirelessly, and because it often will be desirable to prevent unauthorized individuals from obtaining access to the meeting data.

Accordingly, another way to initiate the meeting is for the meeting organizer to distribute note paper for the meeting, with each sheet of paper having been preprinted with a pattern that represents a (preferably unique) meeting identification code, as well as a code indicating the status (i.e., master or slave) of the pen that will be using the paper. Each individual digital pen 21-25 detects the identification codes on its respective paper and then executes the pre-specified process steps associated with its identified status. For example, the assigned master 21 will begin polling for the other meeting participants. In response, the slaves 22-25 individually transmit the meeting identification code to the master 21, thereby registering themselves to participate in the meeting.

Thereafter, a form of "share group" is established in which the master 21 obtains and distributes handwritten notes among the various participants, as described in more detail below. It is noted that the meeting identification code preferably also serves as a data encryption code for securely transmitting data among the digital pens 21-25 that are participating in the share group. Alternatively, or in addition, a separate encryption code is assigned during the digital pen registration process.

Figure 4:
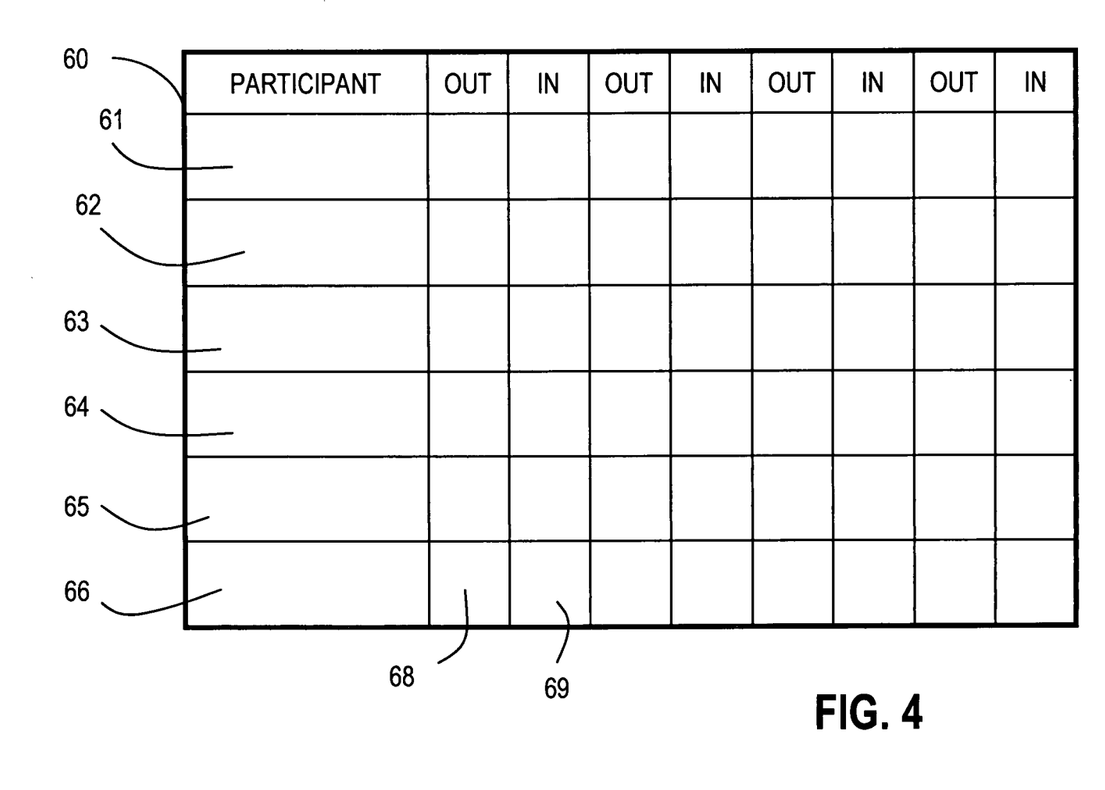
FIG. 4 illustrates an attendee log which is used in a representative embodiment the present invention.

Another example of how the share group may be initiated is described with reference to FIG. 4. In this technique, an attendance log 60 is utilized, and either the meeting organizer (which generally will, but need not, correspond to the master digital pen 21) signs in the various participants on lines 61-66 using his or her digital pen 21-25 or, even more preferably, the individual participants sign themselves in using their own digital pens 21-25. One advantage of the latter approach is that the act of signing in preferably triggers each digital pen 21-25 to simultaneously wirelessly register its unique identification code with the master 21, which then associates the entry on each of lines 61-66 with its corresponding pen identification code.

In any event, in the preferred embodiments of the invention the share group is set up as a Bluetooth "ad hoc network" among the various participant digital pens 21-25. In order to start a shared meeting in the current embodiments, one (or more if scatternets are required) of the pens 21-25 will go into "meeting" mode and become the master 21 of the piconet. Using the standard Bluetooth TDM slot allocation mechanism, the master 21 will poll each of the other pens 22-25 to: (a) retrieve updates and (b) inform that pen which chunks it currently has. Existing elements of the Bluetooth protocol allow the creation of a reliable connection to retrieve the updates. The implementation of the protocol is a trivial round-robin implementation with two request packet types (UPDATE and REQUEST) and their corresponding responses.

It is noted that in the present discussion, it is assumed that a Bluetooth piconet is utilized and, accordingly, the concepts of master and slave are incorporated throughout this discussion. However, it should be understood that the principles described herein may be applied to any other wireless technology, and the master-slave configuration will not always be appropriate to all of them.

Once the share group has been established, the master 21 is responsible for receiving, organizing and distributing all of the digitized handwritten marks made by the various digital pens 21-25. The problem primarily is one of ensuring a consistent set of data between a set of nodes that are independently and asynchronously acquiring it (as their owners make notes), within the constraints of the Bluetooth standard in the currently preferred embodiments. Maintaining consistency between what are essentially file stores is a well-studied problem; a particular implementation is proposed here, but others easily can be considered. Because of the particular idiosyncrasies and limitations of the Bluetooth protocol and the potentially fluid meeting membership, the dataset generally must be organized to allow rapid identification and resolution of inconsistencies.

The currently preferred technique is to label each chunk of writing in a pen 21-25 using a structured identification (ID) and use that structured ID to propagate states between pens. Discrepancies in the state will trigger updates inside a Bluetooth piconet and thence throughout the whole scatternet.

In short, master 21 preferably imposes a hierarchical chunk structure on the generated note data. In this regard, each mark stored by a pen 21-25 preferably is stored as a single chunk of data within that pen. The master 21 combines chunks of data into super-chunks, each referencing multiple individual chunks of data. Basically, a super-chunk may be considered a directory of chunks.

Absent such a hierarchical chunk structure, in a long meeting the number of chunks will soon become unwieldy. However, at any given time the majority of pens already will be substantially up to date, so the preferred technique uses the concepts of super-chunks and checkpoints. As noted above, a super-chunk is a collection (it can be considered a directory) of chunks from all of the pens in the ad-hoc network; it preferably is created when the number of chunks exceeds a threshold. At that point, the master 21 declares a super-chunk. A super-chunk has an ID, just like any other chunk, and a count of the number of chunks in it. A checkpoint is a special kind of super-chunk consisting of all the chunks up to a particular point in time, and it can be considered a collection of super-chunks. Finally, each pen 21-25 preferably has two special collections: a "summary list" consisting of all of the chunks it contains, with the count changing as the pen updates itself, and a "dirty list" consisting of all chunks not previously retrieved by the piconet master 21. The foregoing mechanisms can allow the rapid recognition of changes, and so allow pens 21-25 to issue update requests in a timely fashion.

A general chunk ID preferably is structured as a bit string that includes the following fields, although the number and types of fields may vary from embodiment to embodiment:

1) [PenID]—A number that uniquely identifies the pen.

2) [Sequence #]—Preferably, this field uniquely identifies every chunk within a pen or within a meeting/session.

3) [Meeting ID]—Used to ensure that the overall ID is unique to a meeting.

4) [Count]—The number of data chunks referred to. This can be used to ensure that changes are noted and propagated.

5) [dirty bit]—Indicates that this chunk has changed since it was last retrieved by the master 21.

For a simple chunk, the Count will be 0, and only the PenID and Sequence # typically will be specified. The Meeting ID can be used to create private meetings and to ensure that meetings are uniquely identified. The Count preferably is not used to match IDs. For a super-chunk or a checkpoint, the PenID preferably is that of the master 21 and the Count indicates the number of chunks that it references. For a summary chunk, the Count is the total number of chunks in the applicable pen 21-25 and the Sequence # preferably is zero.

Thus, a Count of zero indicates a simple chunk. A Sequence # of zero preferably indicates a collection of chunks within a given pen 21-25. This scheme is used when generating the IDs, but any other pen need only match the IDs against an internal list and take action only if it does not have an exact match.

Returning to FIG. 3, in step 42 the next (or, in the initial pass, the first) digital pen 22-25 is polled. More specifically, in this embodiment master pen 21 polls one of the slave pens 22-25 (i.e., pen 22 on the first pass). This can be accomplished by retrieving the summary chunk and/or the "dirty list" chunk from the subject digital pen. The dirty list generally will indicate the chunks that need to be retrieved by the master 21, while a comparison of the summary chunk for the polled digital pen 22-25 to the summary chunk contained in master digital pen 21 generally will indicate both the chunks to be retrieved from the polled pen and the chunks to be sent to the polled pen. If the summary chunks in the polled digital pen 22-25 and in the master digital pen 21 match, nothing further need be done. Otherwise, the master 21 preferably examines the dirty list to identify the chunks that need to be retrieved and then, based on a comparison of the summary chunks, determines what chunks need to be sent.

It is noted that, in addition to polling the slave pens, in one embodiment master pen 21 essentially polls itself; alternatively, in another embodiment pen 21 simply automatically incorporates its own chunks, as they are created, into the share group chunk structure. In either event, when master 21 adds chunks either from its own writing system or from a slave its own dirty bit preferably is then set, so those updates will then be propagated throughout the share group.

In step 44, if the comparison of step 42 indicates that the polled digital pen is storing any chunks that master 21 has not yet retrieved, then those chunks are retrieved from such pen in this step 44.

Next, in step 45, master digital pen 21 updates the chunk structure as appropriate, i.e., declaring super-chunks, updating its own summary list and checkpoint, and communicating with the polled pen in order to cause such pen to clear its "dirty list".

In step 47, again based on the comparison of step 42, master pen 21 sends any new chunks of data that it has to the polled pen, i.e., so as to ensure that the pens have the same data. Also in this step, master 21 instructs the polled pen to update its summary list accordingly.

In step 48, the master pen 21 logs the digital pens 22-25 in and out of the share group, as instructed by the meeting organizer. Typically, the meeting organizer will be using the digital pen that has assumed the role of master 21. However, this is not essential. Also, the master 21 preferably even has the ability to log itself out of the share group, transferring the master role to one of the other pens 22-25 in the group.

In any event, it often will be desirable to check participants out of the share group either temporarily or permanently. Such temporary or permanent exclusions may be desirable where, for example, the meeting concerns negotiations and one of the parties wishes to have a private discussion among their own participants only.

For this purpose, the attendance log 60 (shown in FIG. 4) is provided with an alternating sequence of check-out and check-in boxes for each of the participants 61-66. The meeting organizer, using his or her digital pen, simply checks the check-out and check-in boxes associated with each participant 61-66 in order to permanently or temporarily exclude certain digital pens 21-25 from the share group. In one representative embodiment, when the meeting organizer, using his or her digital pen 21, checks a check-out box 68 with respect to a participant 66, that action automatically causes pen 21 to exclude participant 66 as a member of the share group until the meeting organizer checks the check-in box 69 with respect to that participant 66. At the end of the meeting, the meeting organizer simply checks the check-out box for all remaining participants who at that time still are checked in.

Upon completion of step 48 in FIG. 3, processing returns to step 42 to poll the next digital pen 22-25, and the steps repeat as illustrated for the duration of the meeting. It should be noted that, although the steps of FIG. 3 are shown in a particular order, this order is exemplary only, and it should be readily understood that any other sequence instead may be used. In addition, where privacy is not important, step 48 may be omitted in its entirety.

In the foregoing embodiment, the digital pens 21-25 communicate directly with each other, such that each ends up with a complete copy of the meeting notes (subject to any time periods where a given digital pen has been excluded from the share group, as discussed above). However, in other embodiments other devices are utilized for receiving the digitized notes and/or for receiving other information pertaining to the meeting. An example of an embodiment that utilizes such additional devices is now discussed with reference to FIGS. 5 and 6.

Figure 5:
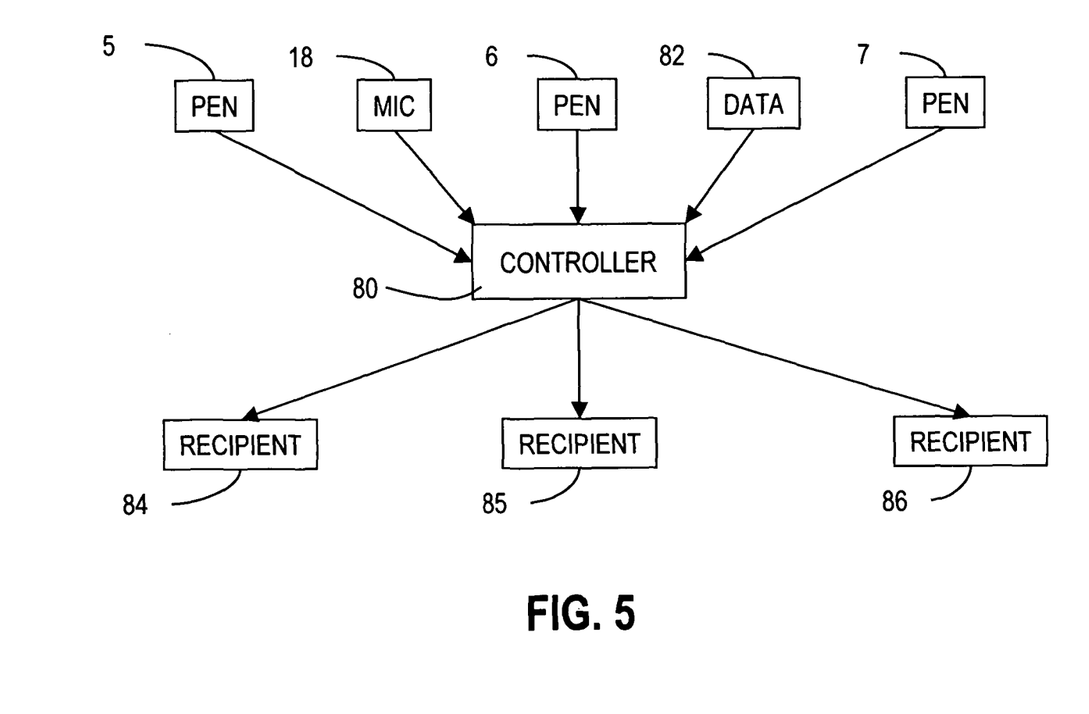
FIG. 5 is a block diagram of a system according to a second representative embodiment of the present invention.

Specifically, FIG. 5 illustrates a block diagram of a system according to a second representative embodiment of the present invention. In this embodiment, a central controller 80 receives data pertaining to the meeting from a variety of different sources, e.g., digital pens 5-7, microphone 18 and at least one additional data source (such as a video camera) 82. Such data are aggregated and distributed to designated recipient devices 84-86, which may or may not include any of the digital pens 5-7. In fact, to the extent possible in any given implementation, recipient devices 84-86 preferably have more features than the simple digital pens that are used for providing the digitized handwritten notes. For example, laptop computers 11-13 preferably are utilized as recipient devices 84-86. As a result, such recipient devices 84-86 generally will be capable of displaying and manipulating the notes taken by other participants in real-time.

For purposes of the following discussion, it is assumed that laptop computers 11-13 are the recipient devices 84-86 and that laptop computer 13 also functions as the controller 80. However, it should be understood that a variety of different configurations may be implemented, with a system of the present invention preferably providing flexibility for accommodating different needs. For instance, a participant may arrive at a meeting with a laptop computer and a digital pen and request that all meeting notes be sent wirelessly to his laptop computer, while another participant may arrive at a meeting with only a digital pen and, preferably by default, his or her digital pen will be designated as a recipient device, so that at the end of the meeting it will contain a full record of all notes taken during the meeting. Still further, a participant may arrive at the meeting with nothing at all, in which case she preferably is loaned a digital pen which she will use to contribute her own notes to the share group; later, she will have the ability to download (e.g., by accessing a Web site) an entire record of the collected meeting data, or at least that portion of the meeting data that was collected while she was a member of the share group.

In certain embodiments, different links are utilized to connect the different input devices to controller 80. For example, in one embodiment pens 5-7 connect to controller 80 via a Bluetooth link, while microphone 18 connects via a direct physical (e.g., USB) cable and input source 82 connects via a 802.11 wireless network or a hardwired Ethernet network.

Similarly, in certain embodiments a variety of different links are utilized for sending the meeting data to the various recipient devices 84-86. For example, in one embodiment some of such recipient devices 84-86 are accessed through the same wireless network (e.g., the same Bluetooth piconet) as are the digital pens 5-7 (e.g., where the recipient device 84-86 actually is one of the digital pens 5-7) while other recipient devices 84-86 are accessed through one or more different networks, such as any hardwired or wireless network, and/or through a direct cable connection. Thus, while pens 5-7 communicate via Bluetooth in one embodiment of the invention, the individual participants' computers receive the meeting data via an 802.11 wireless network and/or through a hardwired Ethernet network.

Figure 6:
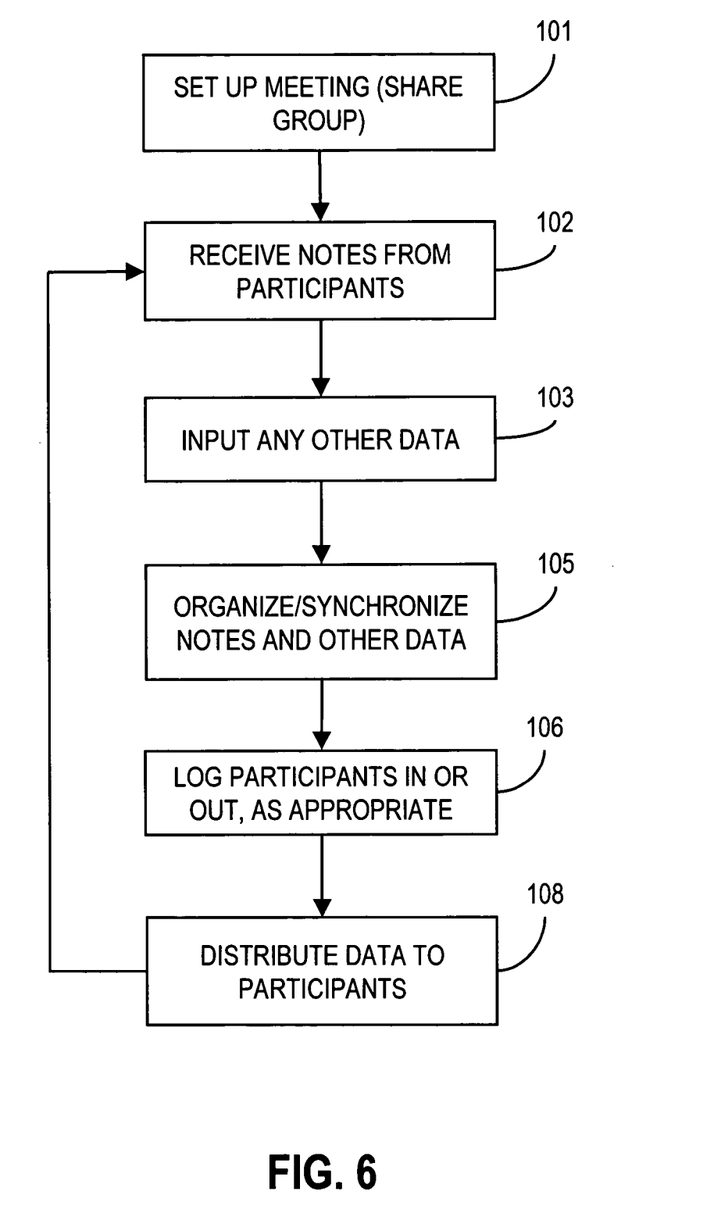
FIG. 6 is a flow diagram for explaining the collection and distribution of data among a number of meeting participants according to the second representative embodiment of the present invention.

FIG. 6 is a flow diagram illustrating one technique for the collection and distribution of data among a number of meeting participants within a configuration such as is illustrated in FIG. 5.

Initially, in step 101 the meeting is established. This may be accomplished in any of the ways described above in connection with step 41. For example, in one embodiment Bluetooth-enabled laptop computer 13 simply polls to identify the Bluetooth-enabled digital pens in the vicinity. Alternatively, in another embodiment computer 13 polls to identify only those Bluetooth-enabled digital pens that have read and can provide the appropriate meeting identification code from paper previously distributed by the meeting organizer. Still further, in another embodiment an attendance log 60 is utilized. As an additional option, in another embodiment a similar attendance log is displayed on computer 13, permitting the meeting organizer to type in the names of the participants using the interface 16 of computer 13. Even with the attendance log maintained on controller 80, however, it often will be desirable to have each attendee sign in with his or her own digital pen in order to efficiently associate the attendees with their corresponding digital pens. Otherwise, some other technique may be used to associate the digital pens 5-7 with the entries in the attendance log. For example, in one alternate embodiment differently patterned note paper is provided to each participant, with each pattern corresponding to a different entry in the attendance log; then, for example, the meeting organizer need only enter the name of the participant for notepaper #1, notepaper #2, etc.

Once the list of attendees has been established, the meeting organizer preferably uses controller 80 to designate the recipient devices 84-86 that are to be used by the participants 1-3. This preferably is accomplished, for example, by using a graphical user interface to map each of the identified participants 1-3 to one (or more) of the networked or directly connected devices detected by controller 80 (e.g., by displaying icons for such detected devices and allowing the meeting organizer to drag one or more of such icons to the participant's name). In such a case, if no device is specified, controller 80 preferably defaults to using the participant's digital pen as the recipient device for that participant. In addition to or instead of specifying a recipient device 84-86 for any given participant, controller 80 preferably also permits the designation of an e-mail address to which controller 80 will send an e-mail message upon conclusion of the meeting, including a link to a site where the participant can download the meeting information that he or she is entitled to receive.

In step 102, each of the then-participating digital pens 5-7 is polled and any data chunks not previously retrieved by controller 80 are retrieved from such pens. Where any particular digital pen 5-7 is functioning as a device for uploading handwritten notes, but not for receiving notes from other pens, preferably the "dirty list" for such pen is examined and the corresponding data chunks are uploaded. Otherwise, in an alternate embodiment a similar technique to that described above in connection with FIG. 3 is utilized.

In step 103, data from any other sources is retrieved. In one embodiment of the invention, data is obtained from microphone 18, from any video camera that is connected to computer 13 and/or from any other data input device 82 that is connected to computer 13, whether wirelessly or via a hardwired connection. For example, according to one embodiment of the invention, one of the digital pens 5-7, e.g., the pen being used by the meeting organizer, provides a sequence of subject-matter indices, indicating the topics being discussed at the current time during the meeting. Such indices preferably are retrieved and recorded by controller 80 for later use in searching the meeting record (e.g., audio, video and notes) to find and review only those portions of the meeting that correspond to desired topics.

Figure 7:
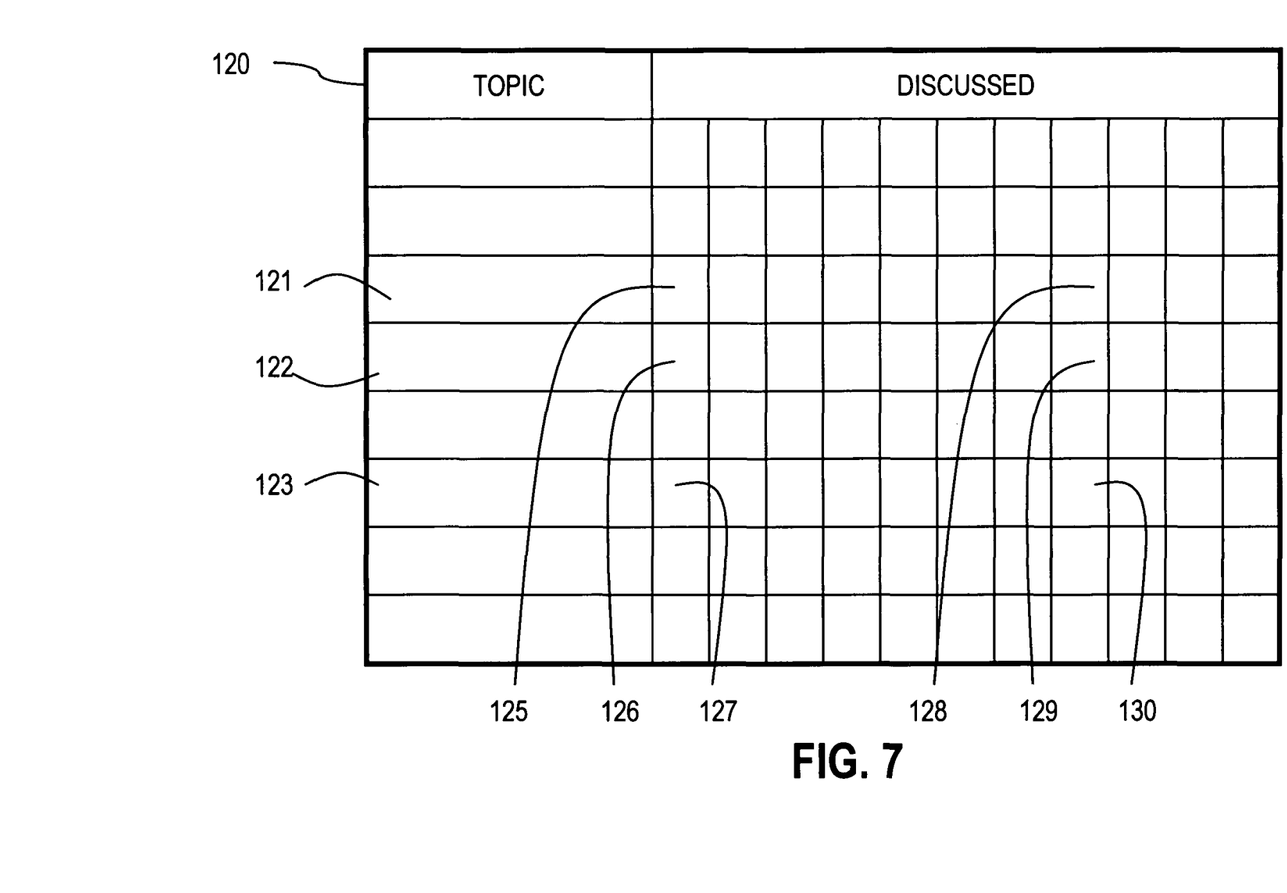
FIG. 7 illustrates one example of a topic chart for indexing a meeting in real time by topic or subject matter covered, according to a representative embodiment of the invention.

For this purpose, it is possible to use a form of topic log 120, such as is shown in FIG. 7. Similar to the attendees log 60 discussed above, topic log 120 would be preprinted as a special form, e.g., with the current meeting identification code. When the meeting organizer marked the name of a topic in one of the "topic" fields (e.g., fields 121-123), such action automatically would trigger his or her digital pen to transmit the markings to the controller 80 (e.g., computer 13 in the present example), together with a flag indicating that the topic currently is being discussed. In response, controller 80 tags the meeting record with that information. Subsequent discussion of other topics would be indicated in a similar manner. Also, if the meeting organizer determined that a previous topic was being revisited, he or she would place a check mark in one of the discussion boxes (e.g., boxes 125-130) corresponding to (i.e., on the same horizontal line as) that topic. Such an action would trigger his or her digital pen to send a message to the controller 80 to place appropriate indices in the meeting record. Discussion of multiple topics simultaneously preferably would be signified by checking multiple discussion boxes in close succession.

Alternatively, the designation of the meeting topic may occur in any of a variety of other ways. For example, in an alternate embodiment the meeting organizer flips to a new page in his or her notes and writes the name of the new meeting topic at the top of the page, thereby effecting the insertion of the appropriate new-topic tag. In such a case, e.g., if a previous topic is revisited, the meeting organizer preferably indicates this by simply writing on the sheet of paper associated with the previous topic. According to a sub-variation of this technique, the meeting organizer is provided with a set of meeting notes divided into sections, with each section reserved for a different topic, and with the meeting organizer simply writing the name of a discussed topic at the top of the first page of a given section to effect the association of that section with the corresponding topic. On the other hand, if the topics to be discussed are known in advance, each participant (or at least the meeting organizer) preferably is provided with a set of notepaper divided into sections, with the topic corresponding to each section pre-printed at the top of the first page of that section.

In step 105, the data collected in steps 102 and 103 are organized and, if applicable, synchronized to create an entire meeting record up to that point. This step preferably involves nothing more than organizing the collected chunks of data into super-chunks, checkpoints, etc., as discussed above. However, if a continuous replayable record of the meeting is to be created, then additional considerations apply. More specifically, in addition to the other chunk ID fields mentioned above, the ID for each chunk of data input in steps 102 and 103 preferably also includes (or are modified in controller 80 to append) a timestamp indicating when the chunk was created (typically for simple chunks only, although in other embodiments each super-chunk includes a time range that is encompassed within it). In this case, controller 80 preferably organizes all of the received data chunks in chronological order.

In step 106, participants are logged in or out of the share group, as appropriate. The step preferably is performed in a similar manner to that described above in connection with step 48. However, when an attendance log is implemented directly on computer 13 (functioning as controller 80), the check-in and check-out boxes of attendance log 60, in one embodiment of the invention, are replaced by radio buttons that can be clicked (on the display for computer 13) to designate whether or not each participant currently is to be included within the share group.

In step 108, all of the collected data is distributed to the participants, excluding (with respect to individual participants) data that was generated during a period of time when each such individual participant was checked out from the share group. Such exclusions can be easily accomplished by comparing the check-in and check-out time information generated from the attendance log to the timestamp information included with each data chunk. Alternatively, as the distribution of the meeting data is being performed in real-time, in another embodiment of the invention individual participants simply are disabled from receiving data updates during time periods when they are checked out from the share group.

Upon distribution of all the currently collected data, the process returns to step 102. The steps of collecting and distributing data are then repeated, all in real time.

Figure 8:
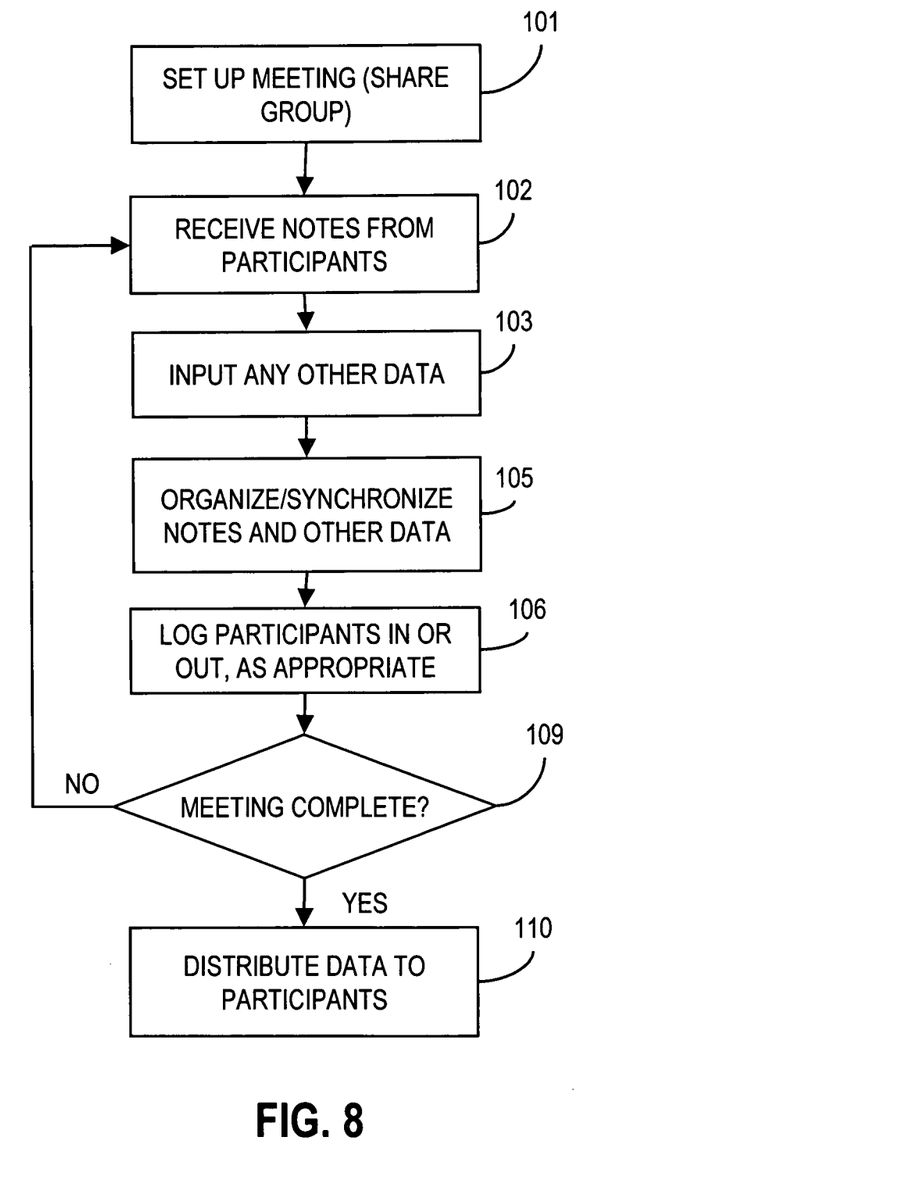
FIG. 8 is a flow diagram for explaining one example of a technique in which collected meeting data is distributed after completion of the meeting, according to a representative embodiment of the invention.

FIG. 8 illustrates a slight variation on the process described above in connection with FIG. 6. Like the process of FIG. 6, the process of FIG. 8 includes steps 101, 102, 103, 105 and 106, and the considerations pertaining to such steps are as described above. However, rather than distributing the data in real-time, the process of FIG. 8 continuously collects the data during the meeting and then distributes it 110 after a determination has been made 109 that the meeting is complete. The distribution of data in step 110 preferably is performed by automatic generation of e-mail messages to each of the participants and/or by using a file transfer protocol. In the latter case, in one representative embodiment, the participants log onto a Web site sometime after the meeting and then initiate a download of the meeting data that has been designated for such participant.

In one embodiment of the invention, the particular data to be distributed to each participant is determined on-the-fly, as the data is downloaded, based on timestamps, if any, that are included in the meeting data and the participation time data produced by the attendance log. Alternatively, in another embodiment, the chunks of data to be subsequently downloaded to each participant are identified in real time during the meeting, e.g., by maintaining a log for each participant that lists such chunks or by tagging each chunk of data with the appropriate participants' identification codes.

Still further, the distribution of the meeting data can be accomplished through a combination of the techniques shown in FIGS. 6 and 8. That is, in one embodiment of the invention some of the participants 1-3 receive the meeting data in real-time and others after the conclusion of the meeting. In fact, it is possible to distribute meeting date both in real-time and subsequently for even the same participant 1-3. For example, in one embodiment an individual participant receives only the meeting notes into his digital pen 5-7 during the meeting, so that he leaves with a complete record of all notes taken. Later, if he wishes to obtain the complete meeting information, including any audio, video and other collected data, he requests a download of such data (or any portion thereof that he is entitled to receive).

One advantage of using other devices and/or subsequent distribution of the meeting data is that the participants in the meeting need not arrive with any particular hardware. Rather, digital pens may be distributed for use during the meeting, with the participants designating a device (e.g., their desktop computers) to receive the meeting data and/or subsequently logging in and downloading a copy of the meeting data.

System Environment.

As indicated above, systems according to the present invention generally will include several wireless-enabled (e.g., Bluetooth) digital pens, which are capable of writing on ordinary paper and also digitizing such marks, storing them and transmitting them wirelessly to other devices. In addition, such digital pens preferably are capable of executing predefined process steps, stored internally as software and/or firmware and/or hard-wired into the device (e.g. using application-specific integrated circuits or gate arrays), based on a triggering action (e.g., checking a particular box on a particular printed form). Presently, however, such digital pens have limited computing power and memory and an even more limited user interface. As a result, a system according to the present invention preferably also includes more feature-packed computing devices.

In fact, generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and/or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and/or chemical processing.

Additional Considerations.

According to certain embodiments of the present invention, the digital pens are aware (via established protocols) of others in the vicinity and can exchange and relay data with and between them. The effect of this is that each attendee in a meeting can leave with a full and accurate transcript of what was written, by whom and when. Moreover, it can also be recorded who was present in each session or sub-session of a meeting when markings were being made, hence allowing a variety of sharing policies. In other embodiments of the invention, some or all of the meeting data is distributed subsequently (not in real time).

The discussion above provides certain techniques for controlling what participants get what portions of the collected meeting data. In certain embodiments of the invention, it is desirable to log who was present at particular times or in particular sub-sessions of a meeting or to restrict sharing to those notes taken when a particular pen was physically present (e.g., to avoid "eavesdropping" on pre- or post-discussions). Both of these goals may realized by the techniques described above, or even by application of the super-chunking method, provided that each super-chunk contained at least one chunk (which could be empty) for every member of the piconet. According to this latter technique, if a node joins the piconet, the master will retrieve updates from it, but will only offer it updates of super-chunks in which it has chunks. Thus, the protocol would be extended to ensure that whenever a super-chunk is declared, it contains a chunk for every member of the piconet. Identifying actual presence then would be simply a case of determining the set of IDs in super-chunks.

Under the Bluetooth protocol, a node can be master of one piconet and a slave in another. The use of super-chunks, summary chunks and dirty chunks means that a piconet master can represent all the nodes in the piconet with no change to the protocol. However, the use of such constructs is entirely optional in practicing the present invention.

The embodiments described above permit participants in a meeting to share notes created by them with each other. Certain marks made by an individual digital pen preferably are interpreted by the pen not as being a note to be shared, but rather as an action-triggering mechanism. For example, in one embodiment of the invention the notepaper distributed by the meeting organizer includes a participation chart (similar to attendance log 60), allowing the individual digital pen to opt in and opt out of sharing notes with the rest of the share group. Unlike the attendance log 60, which primarily would be used to determine which participants receive meeting data from the other participants and from other sources, the participation log primarily would serve to control what the rest of the share group receives from the individual pen. As a result, for example, an individual participant has the ability to temporarily disable sharing while his or her pen is used for doodling or for making other marks that are unrelated to the meeting. Another technique for accomplishing a similar result is to reserve a portion of each page (or a portion of at least some of the pages), and/or even to reserve whole pages, of the distributed meeting notepaper for doodling and other unrelated notes and markings; according to this technique, anything written in the reserved sections and/or pages would not be shared with the other participants in the meeting.

In the embodiments described above, all of the data generally is collected by a single master or controller device and then distributed to the other devices in the share group. However, it also is possible to configure a system according to the present invention as a peer-to-peer network, in which the individual devices communicate directly with each other, without the necessity of a master or a central controller.

Certain of the embodiments described above permit individual participants to view the meeting notes in real time on their own individual computers. It is also possible to displays such notes in real time on a large display screen (e.g., using a digital projector) for multiple meeting participants to see.

Various embodiments of the invention are described above. Advantages that can be obtained through systems of the present invention include the following. By using digital pens, in addition to the electronic sharing, each participant generally will walk away from the meeting with a hardcopy original of his or her own notes. The data captured during a session using the ad-hoc network can be made available to all of its members immediately and in certain embodiments can even be viewed in real-time. An instantaneous backup of the entire meeting can be created. A log of those present, and for what part of a meeting can be automatically created. Meeting notes, with who contributed what, can be generated automatically. The shared data generally captures exactly what was written, and hence is not subject to re-interpretation. In certain embodiments, the entire meeting, or desired portions thereof, can be replayed after the meeting has occurred to accurately reconstruct what happened during the meeting.

In this regard, the time-stamping technique described above can permit one, using appropriate software, to replay the meeting or any desired portions. For example, if topic indices were inserted during the meeting, one would be able to search for only those portions of the meeting that are of interest. The reviewing software preferably would then display that portion of the meeting from, e.g., 5-10 seconds before the corresponding topic tag was inserted into the meeting record until a different meeting tag (indicating discussion of a different topic that the reviewer does not wish to see) was inserted. The automatic display of a short segment prior to the desired topic flag can allow for delays that may have occurred in designating the topic during the course of the meeting.

Preferably, the various types of meeting data are tagged so that a participant has the ability to download and/or display only those types of data that he or she desires. For example, a participant might want to retrieve and/or review all of the meeting notes, but not any audio or video that was recorded during the meeting.

Also, the use of timestamps as indicated above can allow for dynamic viewing of the creation of the meeting notes, rather than or in addition to statically viewing only the finished meeting notes. Basically, the reviewer can be provided with the ability to replay the creation of any desired meeting notes while listening to and/or viewing the meeting itself. Seeing when and/or how particular meeting notes were generated, in the context of the rest of the meeting, often can provide more useful information in interpreting such notes.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for sharing notes, said system comprising:
    a first pen capturing and transmitting information representative of a mark made by the first pen; and
    a second pen receiving the information representative of the mark made by the first pen, wherein the first and second pens are members of a share group pursuant to which marks made by pens in the share group automatically are transmitted to other pens in the share group.

2. A system according to claim 1, wherein the second pen stores the information representative of the mark made by the first pen in a manner so as to permit subsequent reproduction of the mark.

3. A system according to claim 1, wherein the first pen captures and transmits information representative of an arrangement of marks made by the first pen, and wherein the second pen receives and stores the information representative of the arrangement of marks made by the first pen, in a manner so as to the permit subsequent reproduction of the arrangement of marks.

4. A system according to claim 1, wherein the information is transmitted wirelessly from the first pen to the second pen.

5. A system according to claim 1, wherein the second pen captures and transmits second information representative of a mark made by the second pen, and wherein at least one pen other than the second pen receives and stores said second information.

6. A system according to claim 1, wherein one of the pens in the share group functions as a master, collecting the marks made by the other pens in the share group and distributing the collected marks to pens in the share group.

7. A system according to claim 1, wherein the pens in the share group communicate with each other wirelessly.

8. A system according to claim 1, wherein at least some of the pens join the share group by reading a meeting identification code off of a piece of paper.

9. A system according to claim 1, wherein the pens are logged in and logged out of the share group as respective users of said pens enter and leave a meeting that corresponds to the share group.

10. A system according to claim 9, wherein said logging in and logging out is performed by using at least one of the pens to check boxes on an attendance log.

11. A system according to claim 1, wherein marks made by each pen in the share group at any given time automatically are shared with all other digital pens that were in the share group at said given time.

12. A system according to claim 1, wherein the marks are shared among the pens in the share group in real time.

13. A system for sharing notes, said system comprising:
    (a) a plurality of pens, each said pen being capable of capturing, storing and transmitting marks made by said each pen; and
    (b) a control processor that is configured to maintain a share group, by receiving marks transmitted by the pens, and by distributing the received marks to users of the pens in the share group,
    wherein marks made by each pen in the share group at any given time automatically are distributed to all of the users who were in the share group at said given time.

14. A system according to claim 13, wherein the control processor logs the pens in and out of the share group as the users of said pens enter and leave a meeting that corresponds to the share group.

15. A system according to claim 14, wherein the control processor receives login and logout information from at least one of the pens, which makes marks on an attendance log for the meeting, captures said attendance marks and transmits said captured attendance marks to the control processor.

16. A system according to claim 14, wherein login and logout information is input directly into a user interface for the control processor.

17. A system according to claim 13, wherein the control processor also collects and stores at least one of audio or video for a meeting corresponding to the share group.

18. A system according to claim 17, wherein the at least one of audio or video for the meeting is synchronized with the received marks, thereby permitting a subsequent replaying of the meeting.

19. A system according to claim 17, wherein the control processor also stores subject-matter indices for the meeting in real time, thereby permitting a subsequent selective replaying of desired portions of the meeting.

20. A system according to claim 13, wherein the control processor distributes the received marks in real time.

21. A system according to claim 20, wherein the received marks are distributed to at least one device that is configured to display said received marks in real time.

22. A system according to claim 13, wherein at least one of the pens joins the share group by reading a meeting identification code off of a piece of paper.

23. A system for sharing notes, said system comprising:
- a plurality of digital pens, each said digital pen being wireless-enabled and capable of digitizing, storing and wirelessly transmitting handwritten marks made by said digital pen,
- wherein the digital pens collectively execute wireless communication protocols so as to create a share group,
- wherein one of the digital pens in the share group functions as a master,
- wherein the master automatically collects the handwritten marks wirelessly transmitted by the other digital pens in the share group, and
- wherein the master, in real time, wirelessly distributes the collected handwritten marks to the digital pens in the share group.

* * * * *